(12) United States Patent
Harris et al.

(10) Patent No.: US 7,558,589 B2
(45) Date of Patent: Jul. 7, 2009

(54) TALKER ARBITRATION METHOD AND APPARATUS

(75) Inventors: John M. Harris, Chicago, IL (US); Ronald T. Crocker, St. Charles, IL (US); Philip J. Fleming, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 551 days.

(21) Appl. No.: 10/820,520

(22) Filed: Apr. 8, 2004

(65) Prior Publication Data

US 2005/0227722 A1  Oct. 13, 2005

(51) Int. Cl.
*H04B 7/00* (2006.01)
(52) U.S. Cl. .................. 455/518; 455/519; 455/415; 455/456.5
(58) Field of Classification Search .............. 455/412.2, 455/414.2, 414.3, 415, 416, 417, 450, 452.1, 455/509, 510, 515, 517, 518, 519, 520, 521, 455/456.1, 455, 456.5, 67.11, 553.1
See application file for complete search history.

(56) References Cited

U.S. PATENT DOCUMENTS

| | | | |
|---|---|---|---|
| 5,659,881 A | * | 8/1997 | Kent .......................... 455/520 |
| 6,411,815 B1 | * | 6/2002 | Balasuriya ................. 455/512 |
| 6,788,946 B2 | * | 9/2004 | Winchell et al. ............ 455/518 |
| 6,904,288 B2 | * | 6/2005 | Rosen et al. ................ 455/518 |
| 2003/0099214 A1 | | 5/2003 | Schmidt et al. |
| 2003/0143959 A1 | | 7/2003 | Harris et al. |
| 2004/0077358 A1 | * | 4/2004 | Bennett et al. .............. 455/455 |

OTHER PUBLICATIONS

Keshav, Srinivasan et al., An Empirical Evaluation of Virtual Circuit Holding Time Policies in IP-Over-ATM Networks, IEEE Journal On Selected Areas In Communications, vol. 13, No. 8, Oct. 1995, pp. 1371-1382.

* cited by examiner

*Primary Examiner*—John J Lee

(57) ABSTRACT

During the course of a push-to-talk talkgroup wireless communication, decisions (21) are made regarding possible subsequent push-to-talk communication needs for the group. Based at least in part upon such decisions, a network location is identified (22) to provide talker arbitration support for this talkgroup. In one embodiment the identified network location can comprise a mobile station, such as a mobile station that comprises a member of the talkgroup. In a preferred embodiment, the talker arbitration capability is then assigned (24) to the identified network location.

15 Claims, 3 Drawing Sheets

TALKER ARBITRATION METHOD AND APPARATUS

TECHNICAL FIELD

This invention relates generally to wireless communication systems and more particularly to so-called push-to-talk wireless communications.

BACKGROUND

Push-to-talk styled communications are well known in the art. The members of a talkgroup comprising two or more wireless mobile stations are able to wirelessly communicate with one another by simply asserting a push-to-talk button. In many communication systems, assertion of the push-to-talk button does not immediately permit the user to begin talking (and/or transmitting). Instead, assertion of the push-to-talk button initiates a sequence of events whereby the mobile station requests and/or otherwise acquires a communication resource (such as a specific transmission frequency, time slot(s), and/or a spreading code, to name a few) to facilitate the desired communication. In such systems, a specific audible signal will usually be provided to the user when, subsequent to assertion of the push-to-talk button, the mobile station in fact is prepared to at least record and then, usually, to shortly later transmit the user's message.

The duration of delay between when the user first asserts the push-to-talk button and when the user receives the signal indicating that the speech may now commence can vary for a variety of reasons. This delay, however, often becomes an obvious and highly visible measure of quality of service for many users. In general, the shorter the delay, the higher the perception of service quality. In some cases this delay occurs due to circumstances beyond immediate control (for example, high system loading or infrastructure downtime can adversely impact system performance in this regard).

In many instances, however, this delay cannot be reasonably reduced below a minimal duration that is nevertheless a source of disappointment to at least some users. Talker arbitration requirements comprise one such example. Talker arbitration facilitates a decision process whereby the communication system responds to a push-to-talk talk request by ascertaining whether any higher priority (and/or earlier) talk request presents a conflict and arbitrates such a conflict through selection of only one of the requesting parties. A dispatch server usually supports the talker arbitration service in most such systems.

Even when only a single wireless station presently seeks to communicate (i.e., when there is no present conflict) the wireless station must still transmit its intentions to the talker arbitrator at the dispatch server, and the talker arbitrator must still conclude the talker arbitration process and communicate its communication grant (or approval) to the requesting wireless station. This overall process can easily consume 700 milliseconds (or more) even under relatively ideal operating conditions in many systems. This minimal delay floor can lead to a sense of dissatisfaction with respect to the operation and efficiency of the wireless station and/or the communication system.

BRIEF DESCRIPTION OF THE DRAWINGS

The above needs are at least partially met through the provisioning of the talker arbitration method and apparatus described in the following detailed description, particularly when studied in conjunction with the drawings, wherein.

Figure 1:
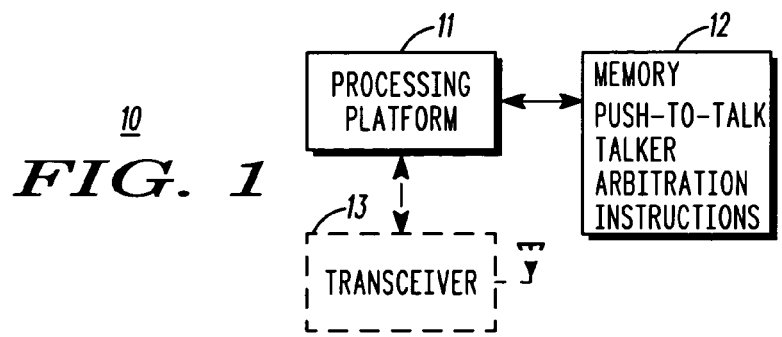
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, talker arbitration functionality is dynamically moved between various network elements in order to potentially achieve reduced push-to-talk delay. Depending upon the embodiment, such functionality can be moved among various dispatch servers. In a preferred embodiment, the talker arbitration functionality can be moved to, and effected by, one of the wireless mobile stations of a given talk group.

Pursuant to one embodiment, and subsequent to initiation of a push-to-talk wireless communication for a talk group, a preferred process automatically considers at least one possible subsequent push-to-talk communication need of the talk group to thereby provide at least one corresponding determination in this regard. This determination then provides a basis for automatically identifying a network location to support talker arbitration for the push-to-talk communication needs of the talk group.

Assessing the possible subsequent push-to-talk communication needs of a talk group can be based upon a wide variety of criteria including, but not limited to, the identity of a presently transmitting mobile station, the identify of a presently receiving mobile station, and any of a wide variety of items of context information regarding the talk group. Such items of context information can comprise, but are not limited to, voice recognition results as correspond to analysis of at least a part of a push-to-talk wireless communication, determining which mobile station of the talk group appears to likely comprise a discussion leader, user manipulation of a mobile station, push-to-talk wireless communications historical information, identification of a most frequent initiator of push-to-talk communications, a geographic location of at least one member of the talk group, and a presence or absence of other concurrently used services, to name a few.

So configured, by appropriately pre-placing talker arbitration functionality, considerable delay time can potentially be avoided. In many instances a user will be notified of talk approval in less time than is usually presently possible. For example, in a multi-server system, one may choose to place the talker arbitration functionality in a server that is closer (in terms of "delay," where distance or other propagation issues and phenomena can be contributing factors) to the mobile or mobiles that are most likely to next assert a push-to-talk.

For example, in a group or private call with one party in San Francisco and another party in Washington, D.C., and where there is a dispatch server in each of the two cities, one might decide to place the talker arbitration capability at the server in the city of the mobile station that just received a last audio segment, or one might decide to place the talker arbitration capability in the city where most of the parties in the group call are presently located.

Referring now to the drawings, and in particular to FIG. 1, a suitable platform 10 to support this flexible approach will typically comprise a processing platform 11 and a corresponding memory 12. In a preferred embodiment the memory 12 will at least have push-to-talk talker arbitration instructions stored therein (i.e., programming to permit the processing platform 11 to effect the talker arbitration task(s)). The processing platform 11 itself comprises a mechanism to facilitate the activation and use of push-to-talk talker arbitration instructions in response, for example, to detection of a predetermined condition such as a trigger event or condition. So configured, the processing platform 11 can selectively serve to use such push-to-talk arbitration instructions to arbitrate push-to-talk communications for one or more talk groups.

Such a processing platform 11 can be disposed as appropriate to the needs of a given application. For example, pursuant to one embodiment, the processing platform 11 can comprise a part of a dispatch server. Pursuant to another embodiment, this apparatus 10 can comprise a wireless push-to-talk mobile station. Other elements, components, and functionality as appropriate to such embodiments can of course be included as appropriate and as would otherwise be well understood in the art. As one illustration of this point, when this apparatus 10 comprises a wireless push-to-talk mobile station, the processing platform 11 will likely operably couple to a wireless transceiver 13 (again as is well understood in the art).

Those skilled in the art will understand and appreciate that the processing platform 11 can comprise a fully or partially programmable platform or can comprise a more hard-wired dedicated purpose fixture as may best accord with the needs and design requirements of a given application. It will also be understood that the functionality of the processing platform 11 can be realized through use of an integrated sole-purpose platform, an integrated multi-purpose platform that supports other functionality, or a distributed multi-platform embodiment where portions of the talker arbitration capability are carried out by various corresponding physically discrete entities. In a similar fashion it will be understood that the memory 12 can comprise a physically distinct entity from the processing platform 11 (as suggested by the illustration) or can comprise an integral part thereof. It will also be understood that the memory 12 can comprise a single element or a distributed entity that subsumes a plurality of physically discrete elements. And, in a similar vein, it will also be appreciated that the memory 12 can be physically disposed proximal to the processing platform 11 or can be located remotely with respect to the processing platform. These and other architectural and configuration options are well understood in the art and require no further elaboration here.

So configured, one or more network elements in a given communication system (including multiple dispatch servers and mobile stations themselves) are capable of selectively providing push-to-talk talker arbitration services in support of, for example, push-to-talk communications as conducted amongst members of a given talk group.

Figure 2:
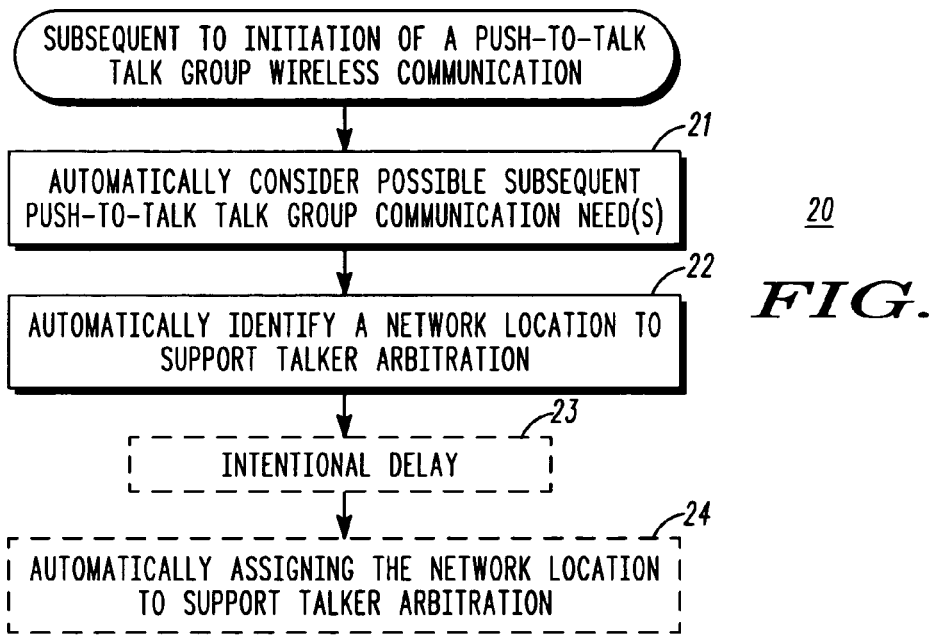
FIG. 2 comprises a flow diagram as configured in accordance with various embodiments of the invention.

Referring now to FIG. 2, a process 20 to make effective use of such an apparatus 10 (or any other platform or configuration as may be capable of compliant operation) will be described. This process 20 preferably occurs, at least in substantial part, subsequent to initiation of a push-to-talk talkgroup wireless communication. For example, this process 20 can be usefully processed during a time when one member of a push-to-talk talkgroup is presently allocated an active wireless channel to support a push-to-talk wireless communication to members of their respective talkgroup (for example, a talkgroup comprising two or more mobile stations in accordance with well understood prior art practice).

This process 20 automatically considers at least one possible subsequent push-to-talk communication need of the talk group to thereby permit provision of at least one corresponding determination. This consideration can include a wide variety of factors and/or criteria. For example, this consideration can comprise automatically identifying at least one target mobile station to which the present push-to-talk wireless communication is directed. This can comprise a potentially useful consideration because the party to whom a present communication is directed may likely be presumed to then wish to next respond to the present communication. This, in turn, can lead to a corresponding determination that this potential action of the recipient party represents a possible subsequent push-to-talk communication need in that this recipient party may well be a next party to seek allocation of a wireless resource.

Other considerations can be taken into account as well, of course. For example, one or more items of context information regarding the talk group may be usefully considered. Examples of potentially useful context information include, but are not limited to:

voice recognition results as correspond to analysis of at least a part of a push-to-talk wireless communication (for example, to identify the name of a person to whom the present user is speaking such that this detected name can be correlated against a list of user names and mobile station identifiers to thereby facilitate identification of a likely next speaker);

determining which mobile station of the talk group appears to likely comprise a discussion leader (as the discussion leader might be expected to speak more frequently than other participants under at least some circumstances);

determining which mobile station of the talk group comprises an originating mobile station as regards the push-to-talk wireless communication;

user manipulation of a mobile station (for example, grasping a handset or remote microphone in a particular fashion (as might be detectable using a variety of mechanisms as are presently understood in the art) might be an early indication of an intent to assert the push-to-talk button);

push-to-talk wireless communications historical information (where, for example, it might be possible to identify a particular mobile station and/or user that historically tends to communicate more frequently than others of a given talk group);

identification of a most frequent initiator of push-to-talk communications (for example, by reference to historic and/or presently accumulated corresponding statistics);

geographic location of at least one member of the talk group (as might be ascertainable using global positioning system or other location techniques); and/or a presence or absence of other concurrently used services, to name a few.

the type or length of the previous push-to-talk communication (for example, if the previous push-to-talk communication did not contain any audio content or was a so-called call alert, then it may be deemed that the next push-to-talk event is less likely to be from the recipient;

the target's current status as being in a meeting or not as inferred, for example, from a calendar meeting schedule for the target;

the number of members in the push-to-talk group (for example, when servicing a larger group, it may not be useful to flexibly assign the talker arbitration functionality due to a possibly increased degree of ambiguity regarding accurately identifying a likely next speaker).

the RF congestion, frame erasure rate, or link speed achieved (For example, in a group call where mobiles A and B are each equally likely to next assert a push-to-talk, one can break such a tie by placing the talker arbitration functionality at the mobile with the higher data rate and better RF conditions; amongst other benefits this can reduce the amount of system delay that will occur if, instead of A or B, a third mobile next asserts a push-to-talk. This benefit can occur, at least in part, because such a strategy will locate the talker arbitration functionality at a mobile station that has superior communication conditions and that can therefore potentially more quickly respond to another mobile station than, for instance, a mobile station experiencing a lower bit rate link with higher frame erasure rates.).

In general, any accessible information that can potentially inform an ability to assess a need for one or more members of a talk group to likely require, in a relatively near-term time frame, a push-to-talk communication resource can comprise an appropriate basis, at least in part, for this consideration. It would also be possible to select or de-select the use of certain consideration criteria as based upon static or dynamic triggers such as time of day, talk group identity, age of available information, and so forth. And, it would also be possible to weight available information (particularly when considering more than one type or source of information) to reflect whatever information may be available regarding a relative sense of importance, trustworthiness, or accuracy.

These same kinds of criteria can also be used to influence or control other timing aspects. For example, when the target is deemed to be less likely to next assert a push-to-talk for any such reason, then the talker arbitration functionality may revert from that target mobile station to the dispatch server after a shorter time interval than might otherwise be allotted.

As another example, criteria of this type may also be used to impact the timing of how long assignment of the talker arbitration functionality is intentionally delayed; generally this delay may preferably be shorter if the target has a shorter delay before that user becomes aware that the floor is open or has a shorter delay until that user can request the floor. For example, longer playout buffers (which in turn can result from a variety of situations including degraded radio frequency conditions) can result in a longer delay before the target knows the floor is open.

The process 20 then automatically identifies 22 a network location to support talker arbitration for the push-to-talk communication needs of the talk group as a function, at least in part, of this corresponding determination. As already noted, this network location can comprise, depending upon the embodiment, one or more infrastructure elements such as a dispatch server and/or a mobile station (including, preferably, one or more mobile stations that comprise a part of the presently supported talk group). For example, upon having previously identified a present communication target for the present push-to-talk communication, this process 20 can facilitate identification of that communication target to subsequently support talker arbitration (specific benefits of such a decision will be discussed in more detail below).

Depending upon the embodiment, the process 20 may then optionally pose an intentional delay 23. That is, the process 20 may intentionally delay a subsequent automatic assignment of the talker arbitration function to the identified network location. This delay may be, for example, for a predetermined amount of time or as may be more dynamically ascertained (depending upon the capabilities and needs of a given embodiment). During this period of intentional delay, the process 20 can accommodate other processes if so desired. For example, the process 20 can detect whether one or more specific conditions of interest occur during this period of delay and, when such a condition of interest does occur, automatically re-identifying a (possibly new) network location to support the talker arbitration needs of this talk group. For example, one possible condition of interest is whether a just-previous transmitting mobile station is again immediately seeking to initiate a subsequent push-to-talk wireless communication. Under such circumstances it may be better in some cases to leave the talker arbitration functionality at its present location.

Depending upon the embodiment, this process 20 then automatically assigns 24 the identified network location to support talker arbitration for the talk group. Such an assignment can be effected in any of a variety of ways. As one example, at least one explicit message indicating such assignment can be transmitted to the identified network location. As another example, a signal can be transmitted to the identified network location that indicates such assignment in a more implicit manner. For example, the signal might comprise an end-of-transmission signal as would ordinarily be sourced by a concluding mobile station upon concluding its push-to-talk transmission. This end-of-transmission signal might additionally convey to a properly prepared mobile station a triggering message to activate the talker arbitration functionality. Other control strategies and hand-off devices and/or signals can of course be employed as appropriate or desired.

Figure 3:
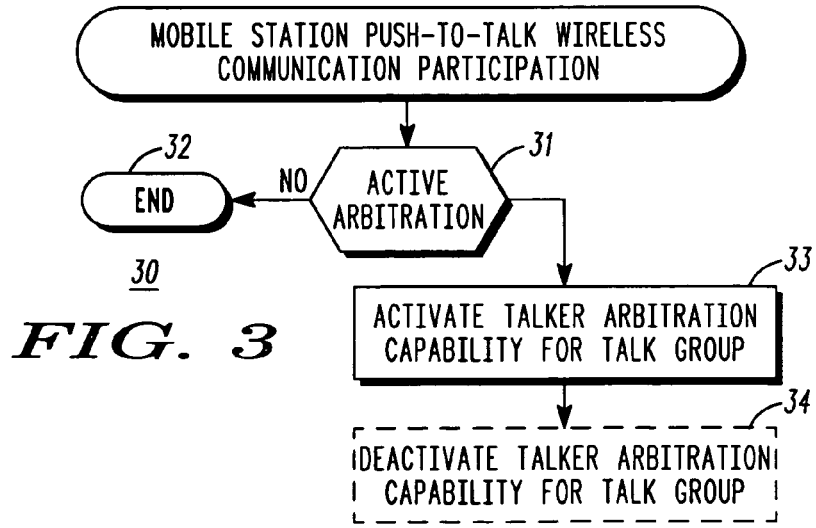
FIG. 3 comprises a flow diagram as configured in accordance with various embodiments of the invention.

Referring now to FIG. 3, a given mobile station process 30 will determine 31 to activate such talker arbitration functionality in response, for example, to receiving at least a first predetermined signal as suggested above (again, such a signal may comprise a signal such as an end-of-transmission signal or a more explicit instruction to activate the talker arbitration capability). In the absence of such an instruction, the mobile station will typically end 32 this consideration for the moment and continue with its ordinary processing. This determination can be repeated as often as may be useful and relevant given the operating circumstances of a given system and the capabilities of a given mobile station as will be well understood by skilled practitioners.

When the mobile station does decide to activate the talker arbitration capability, the mobile station activates 33 talker arbitration capability for its talk group. This means that this mobile station will conduct the talker arbitration function for this particular talk group. By appropriate dynamic placement of this function in this way, and as will be illustrated below, it is possible to achieve a considerable reduction in delay times as are ordinarily associated with initiating a push-to-talk wireless communication in such systems.

In a preferred embodiment this process 30 will also accommodate deactivation 34 of the talker arbitration capability. This permits the talker arbitration function to again be moved to another network location in accord with the teachings set forth above. Such deactivation can be in response to a wide variety of operational conditions. For example, such deactivation may be programmed to occur automatically at the receipt of a next end-of-transmission signal. As another example, such deactivation may occur upon receipt of a deactivation signal by the mobile station.

Figure 4:
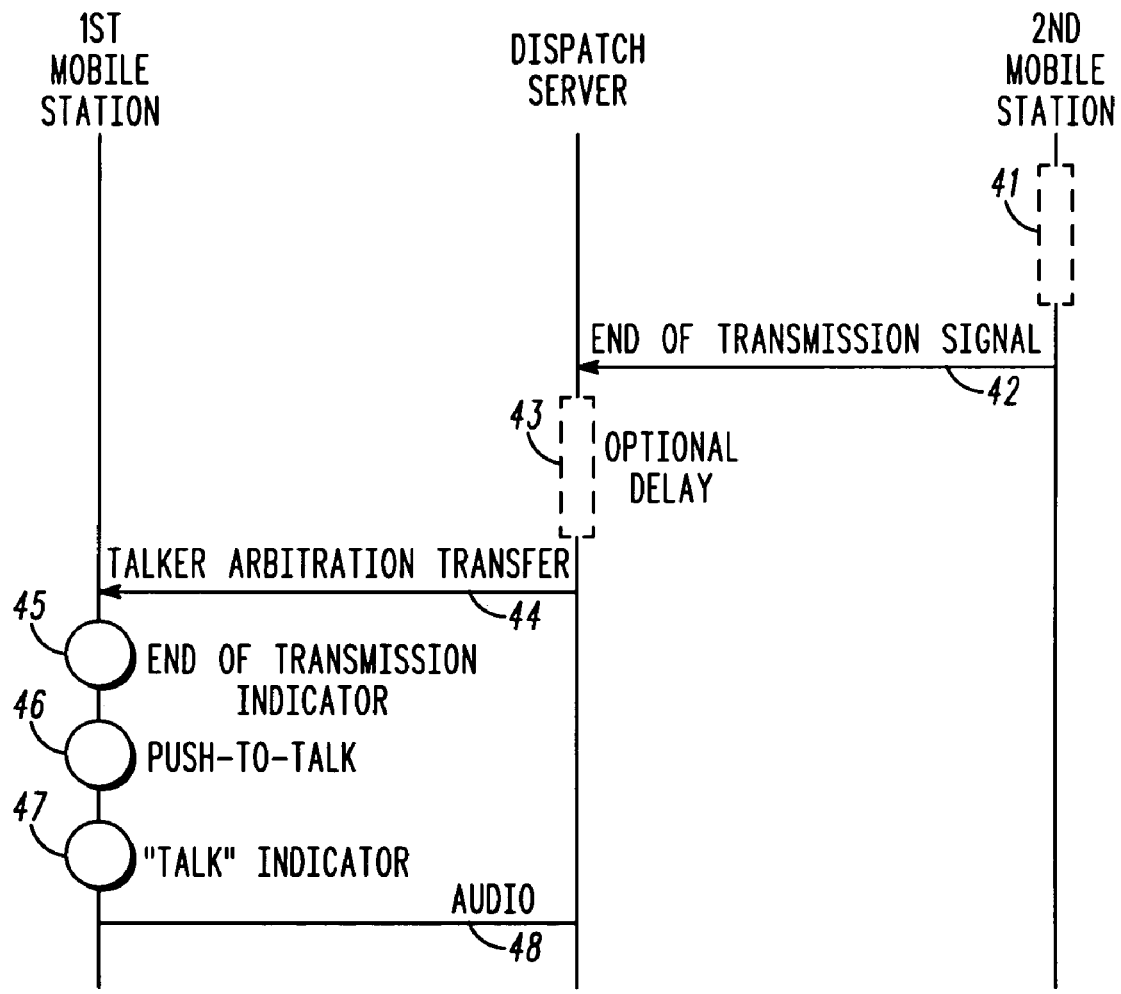
FIG. 4 comprises a signal flow diagram as configured in accordance with various embodiments of the invention.

Referring now to FIG. 4, an illustrative example of a portion of a compliant push-to-talk communication session will be described. This simple example begins with a first mobile station receiving a push-to-talk communication from a second mobile station. During the time 41 that the second mobile station sources this transmission, a dispatch server supporting the communication needs of this small talk group identifies the first mobile station as being the transmission recipient and further identifies the first mobile station as being the next network element to support the talker arbitration function for this talk group. When the second mobile station concludes its transmission, the second mobile station sources an end-of-transmission signal 42 that is received by the dispatch server in accord with well understood prior art practice. Then (perhaps following an optional period of delay 43 as described above to more readily and efficiently accommodate, for example, a relatively near-term fresh push-to-talk transmission need of the second mobile station), the dispatch server transmits to the first mobile station a talker arbitration transfer signal 44 such as those described above.

Upon receipt of this talker arbitration transfer signal 44, and as described above, the first mobile station activates its talker arbitration capability. The first mobile station also provides an end-of-transmission indicator 45 to the user of the first mobile station (for example, many such mobile stations provide a distinctive audible sound to indicate that the previously transmitting party has concluded their transmission). Upon detecting that the user has asserted the push-to-talk button 46, the first mobile station begins its channel acquisition/talk permission process. This includes provision of a corresponding talk request to the talker arbitrator in accord with ordinary practice. In this example, however, the talker arbitration function is presently supported by the first mobile station. As a result, the talker arbitrator can receive and respond to the talk request of the first mobile station in considerably less time than would ordinarily be experienced. For example, rather than requiring upwards of 700 milliseconds to effect this process, a "talk" indicator 47 can be provided to the user virtually immediately as the overall arbitration process will now, in such an example, likely require less than 100 milliseconds.

The user of the first mobile station can then use the allocated communication resource/permission to support the desired audio transmission 48 in ordinary course.

When assigning the talker arbitration function as described above, of course, the system will typically not know with certainty the identity of a next user of the push-to-talk communication resource. For example, in the illustrative scenario just described, the second mobile station (or another mobile station in the talk group other than the first mobile station) may be the next mobile station to seek transmission resources. When this occurs, and with continuing reference to the scenario just described, the first mobile station will simply effect the talker arbitration function for the requesting mobile station.

Figure 5:
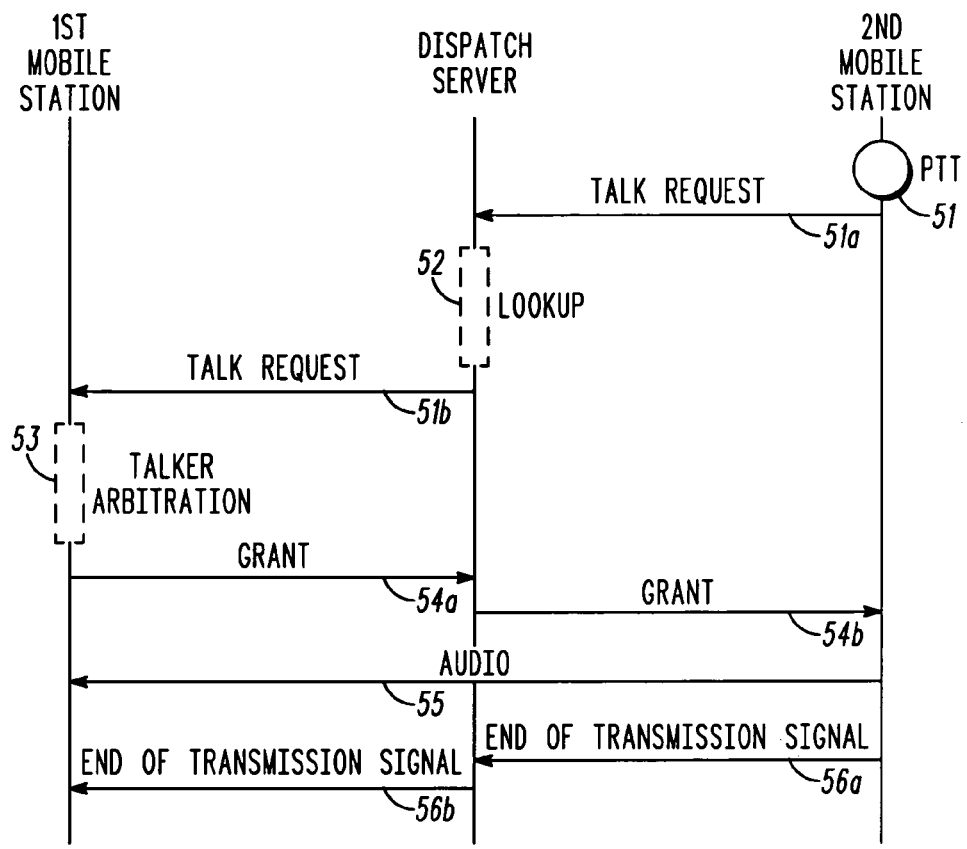
FIG. 5 comprises a signal flow diagram as configured in accordance with various embodiments of the invention.

To illustrate, and referring now to FIG. 5, the second mobile station may be the first station to experience a push-to-talk button assertion 51 by its respective user. The second mobile station will then issue a talk request 51A to the dispatch server. The latter, in turn, can perform a look-up 52 in an appropriate memory resource to identify the present location of the talker arbitrator (as a less preferred alternative, the dispatch server could poll the mobile stations of the talk group to identify the present talker arbitrator). In this example, the dispatch server would therefore identify the first mobile station as the present talker arbitrator. Accordingly, the dispatch server will forward the talk request 51B to the first mobile station.

The first mobile station will then process 53 that talk request in accordance with its talker arbitration programming and capability. In this example, there are no earlier or otherwise competing talk requests and therefore the talker arbitration platform (i.e., the first mobile station) will issue a grant 54A that the dispatch server forwards 54B to the second mobile station. The latter then transmits its audio information 55 to the first mobile station and, upon concluding that transmission, sources an end-of-transmission signal 56A that the dispatch server will again forward 56B to the first mobile station.

So configured, it can be seen that flexibly locating, and even dynamically locating, the talker arbitrator functionality for a talk group need not unduly impair unexpected communication needs. More particularly, actual communication needs that conflict with the presumptions that underlie flexible placement of the talker arbitration functionality are nevertheless still processed and supported in an effective manner.

Figure 6:
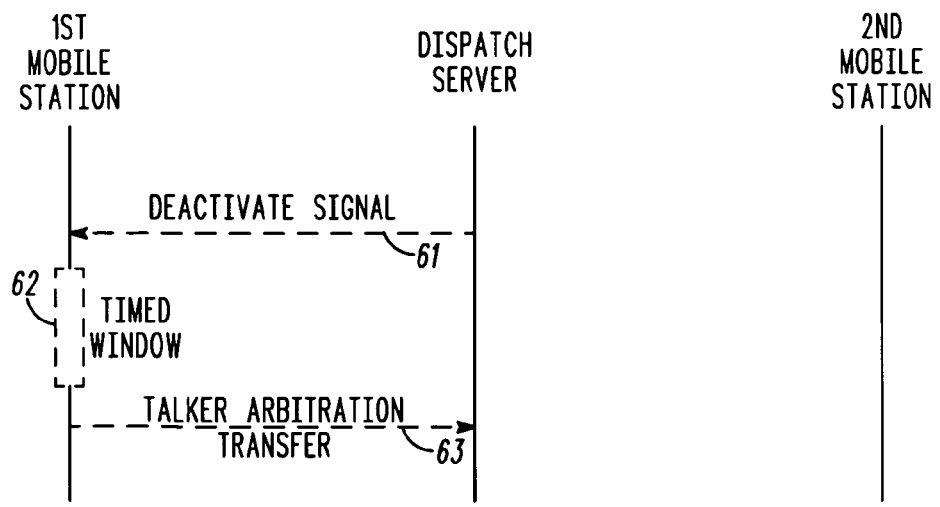
FIG. 6 comprises a signal flow diagram as configured in accordance with various embodiments of the invention.

At some point, it will typically be desired or appropriate to relocate the talker arbitration functionality from such an assigned mobile station. With reference to FIG. 6, and as otherwise noted above, a deactivation signal 61 of appropriate nature and/or a predetermined window 62 of activity (or inactivity) can be used to effect a transfer 63 of the talker arbitration function away the mobile station. For example, the mobile station can transmit a message to signal deactivation of the talker arbitration function and/or to transmit the enabling programming itself to, for example, a dispatch server. As another example (not illustrated), the first mobile station could transmit a message to signal a hand-off of the talker arbitration function to another location such as another mobile station.

These examples and scenarios are intended to be illustrative only and are not intended to constitute an exhaustive listing of the many various way in which flexible positioning of a talker arbitration capability with respect to the members of a given talk group and/or the infrastructure elements that support or facilitate the communications of such a talk group can be accomplished in accord with these teachings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, when multiple dispatch servers support different arbitration methods towards their served mobile stations, such that when a mobile station served by a given server has the floor it will use this indigenous method of floor control, this might present a problem for a foreign mobile station that expects to use a different floor control methodology. In such a situation, when a mobile station being presently served by a foreign server has control and this same mobile station makes a floor control request, its server can be configured and arranged to translate the floor control method to the appropriate floor control method and relay the translated request to the foreign server for arbitration as is otherwise described above.

It will also be understood by those skilled in the art that these teachings are generally applicable to other forms of communication where floor-control-like mechanisms are employed, such as:

- push to video calls (where video content substitutes for audio content in the descriptions above);
- push-to-see or photo calls (where one is transmitting images or some other data file instead of voice);
- telephone interconnect full-duplex voice calls (where one is providing a method to more rapidly establish a full-duplex voice call between users; in a case such as this, flexible location of the floor control functionality would likely not be required upon establishment of the full-duplex link);
- text messaging or text chat where floor control mechanisms are often of critical importance.

We claim:

1. A method comprising:
   subsequent to initiation of a push-to-talk wireless communication for a talk group;
   automatically considering at least one possible subsequent push-to-talk communication need of the talk group to provide at least one corresponding determination;
   automatically identifying a network location to support talker arbitration decisions for the push-to-talk communication needs of the talk group as a function, at least in part, of the corresponding determination;
   intentionally delaying, for at least a predetermined period of time, automatically assigning the network location to support talker arbitration for the talk group.

2. The method of claim 1 wherein the talk group comprises a first mobile station and a second mobile station.

3. The method of claim 2 wherein the talk group further comprises at least a third mobile station.

4. The method of claim 1 wherein subsequent to initiation of a push-to-talk wireless communication for a talk group further comprises at least partially during a time when an active wireless channel is allocated to support the push-to-talk wireless communication.

5. The method of claim 1 wherein automatically considering at least one possible subsequent push-to-talk communication need of the talk group further comprises automatically identifying at least one target mobile station to whom a present push-to-talk wireless communication is directed.

6. The method of claim 5 wherein automatically identifying a network location to support talker arbitration decisions for the push-to-talk communication needs of the talk group as a function, at least in part, of the corresponding determination further comprises identifying the target mobile station as the network location to support talker arbitration for the push-to-talk communication needs of the talk group.

7. The method of claim 1 wherein automatically considering at least one possible subsequent push-to-talk communication need of the talk group farther comprises automatically considering at least one item of context information regarding the talk group.

8. The method of claim 7 wherein automatically considering at least one item of context information regarding the talk group further comprises automatically considering at least one of:
   voice recognition results as correspond to analysis of at least a part of a push-to-talk wireless communication;
   determining which mobile station of the talk group appears to likely comprise a discussion leader;
   determining which mobile station of the talk group comprises an originating mobile station as regards the push-to-talk wireless communication;
   user manipulation of a mobile station;
   push-to-talk wireless communications historical information;
   identification of a most frequent initiator of push-to-talk communications;
   geographic location of at least one member of the talk group;
   a presence of other concurrently used services;
   the type or length of the previous push-to-talk communication
   the target's current status as being in a meeting or not as from a calendar meeting schedule for the target;
   the number of members in the push-to-talk group;
   the RF congestion, frame erasure rate or link speed achieved.

9. The method of claim 1 wherein automatically identifying a network location further comprises identifying a mobile station that comprises a member of the talk group.

10. The method of claim 1 wherein automatically identifying a network location further comprises identifying a network server.

11. The method of claim 1 and further comprising:
    automatically assigning network location to support talker arbitration for talk group.

12. The method of claim 11 wherein automatically assigning network location to support talker arbitration for talk group further comprises transmitting at least one explicit massage to the network location to indicate assignment of talker arbitration to network location.

13. The method of claim 11 wherein automatically assigning network location to support talker arbitration for talk group further comprises transmitting a signal to the network location to indicate assignment of talker arbitration to the network location.

14. The method of claim 1 wherein the talk group further comprises:
    detecting, while intentionally delaying automatically assigning the network location, a condition of interest:
    automatically identifying a network to support talker arbitration for the push-to-talk communication needs of the talk group as a function, at least in part, of the condition of interest.

15. The method of claim 14 wherein detecting condition of interest further comprises detecting that a just-previous transmitting mobile station is seeking to initiate a subsequent push-to-talk wireless communications.

* * * * *